A. KLAY.
GRINDER.
APPLICATION FILED OCT 17, 1919.

1,389,588.

Patented Sept. 6, 1921.
4 SHEETS—SHEET 1.

Inventor
A. Klay.

Witness

By C. A. Snow & Co.
Attorneys

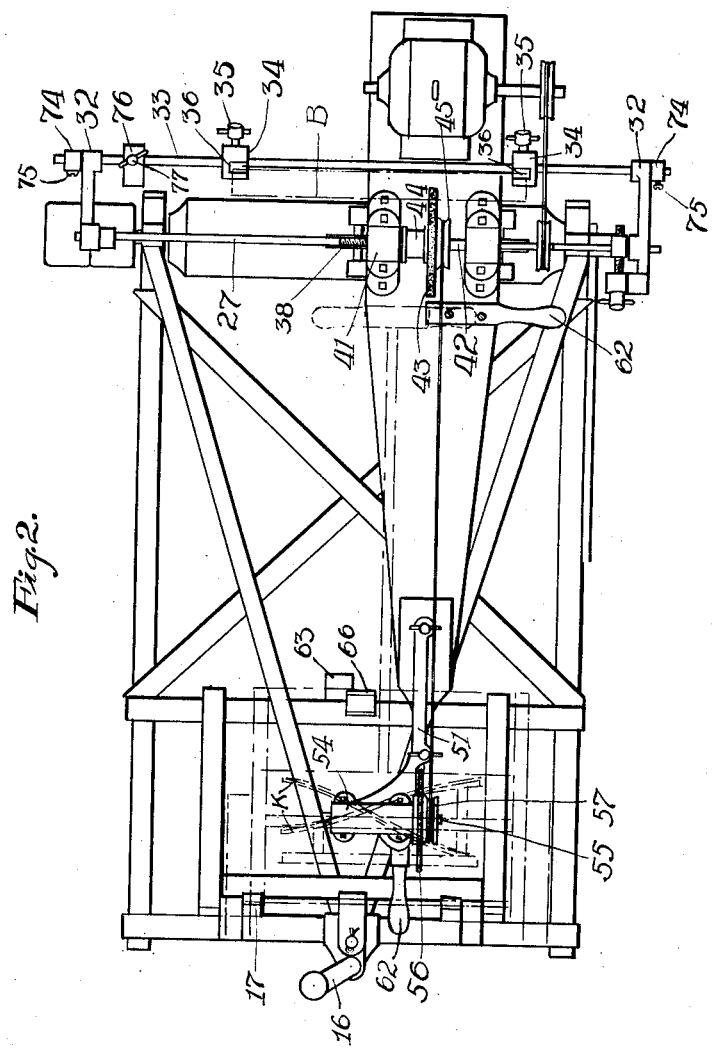

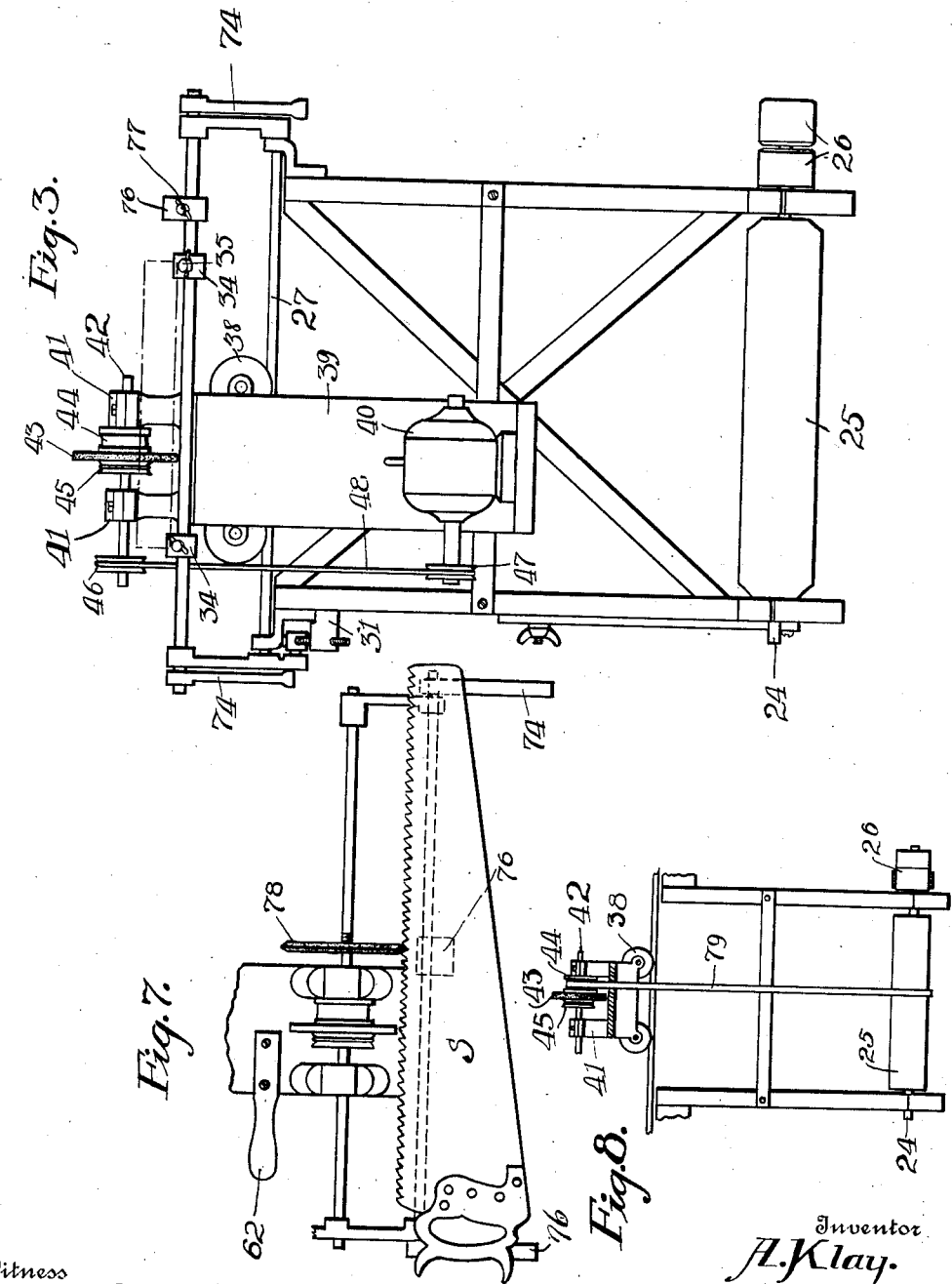

A. KLAY.
GRINDER.
APPLICATION FILED OCT 17, 1919.
1,389,588.
Patented Sept. 6, 1921.
4 SHEETS—SHEET 4.
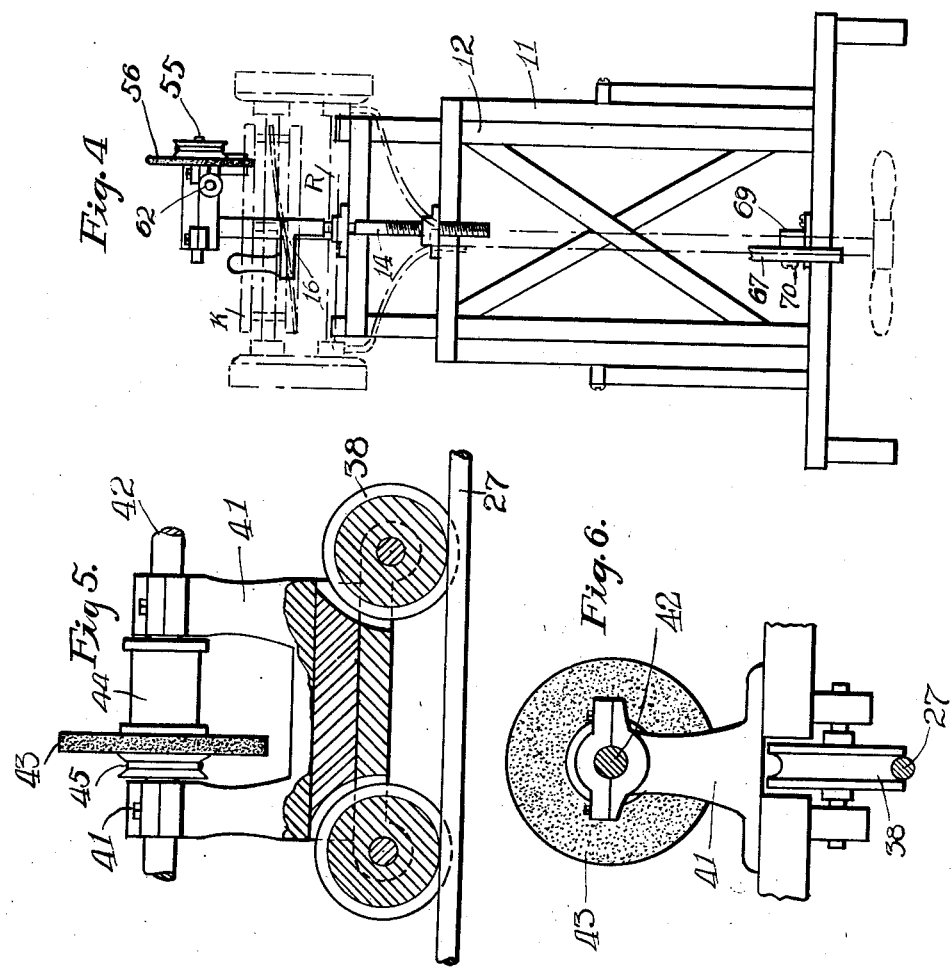
Inventor
A. Klay.
By C. A. Snow & Co.
Attorneys
Witness

UNITED STATES PATENT OFFICE.

ANDREW KLAY, OF LIMA, OHIO.

GRINDER.

1,389,588.  Specification of Letters Patent.  Patented Sept. 6, 1921.

Application filed October 17, 1919. Serial No. 331,374.

*To all whom it may concern:*

Be it known that I, ANDREW KLAY, a citizen of the United States, residing at Lima, in the county of Allen and State of Ohio, have invented a new and useful Grinder, of which the following is a specification.

This invention relates to grinding devices and more particularly to that type of grinding machines that is adapted for use in grinding lawn mowers and the like, and for gumming or grinding saws.

An object of this invention is to provide a grinding device of novel construction and having its components so arranged that the helically disposed reel knives of the usual lawn mower may be uniformly and accurately ground or sharpened, the surface or edge thus ground being disposed to properly coöperate with the usual ground or bar knife.

Another object of this invention is to provide a grinding device embodying means for grinding or sharpening the bar or ground knife of the usual lawn mower, and that portion of the ground knife thus sharpened being disposed to properly coöperate with the reel knives of the lawn mower.

A further object of this invention is to provide a grinder of generally improved construction, whereby the device will be simple, durable, and inexpensive in construction as well as practical, serviceable and efficient in its use.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

This invention has been illustrated in its preferred embodiments in the accompanying drawings, wherein:

Fig. 2 is a plan view of the grinding device.

Fig. 3 is an end view of the device showing the usual bar knife, by dotted lines, in position to be sharpened, remote parts of the device being omitted.

Fig. 4 is a view of that end of the grinding device which is remote from the end shown in Fig. 3, the lawn mower being clamped in position for grinding, and remote parts of the grinding device being omitted.

Fig. 5 is a fragmental transverse sectional view taken through the traveling carriage and support.

Fig. 6 is a fragmental sectional view taken at right angles to Fig. 5 through the traveling carriage support.

Fig. 7 is a fragmental plan view of one end of the device showing the usual saw supported in position for grinding or gumming and Fig. 8 is a fragmental end view showing the elongated pulley operatively connected to the grinding devices.

Figure 1:
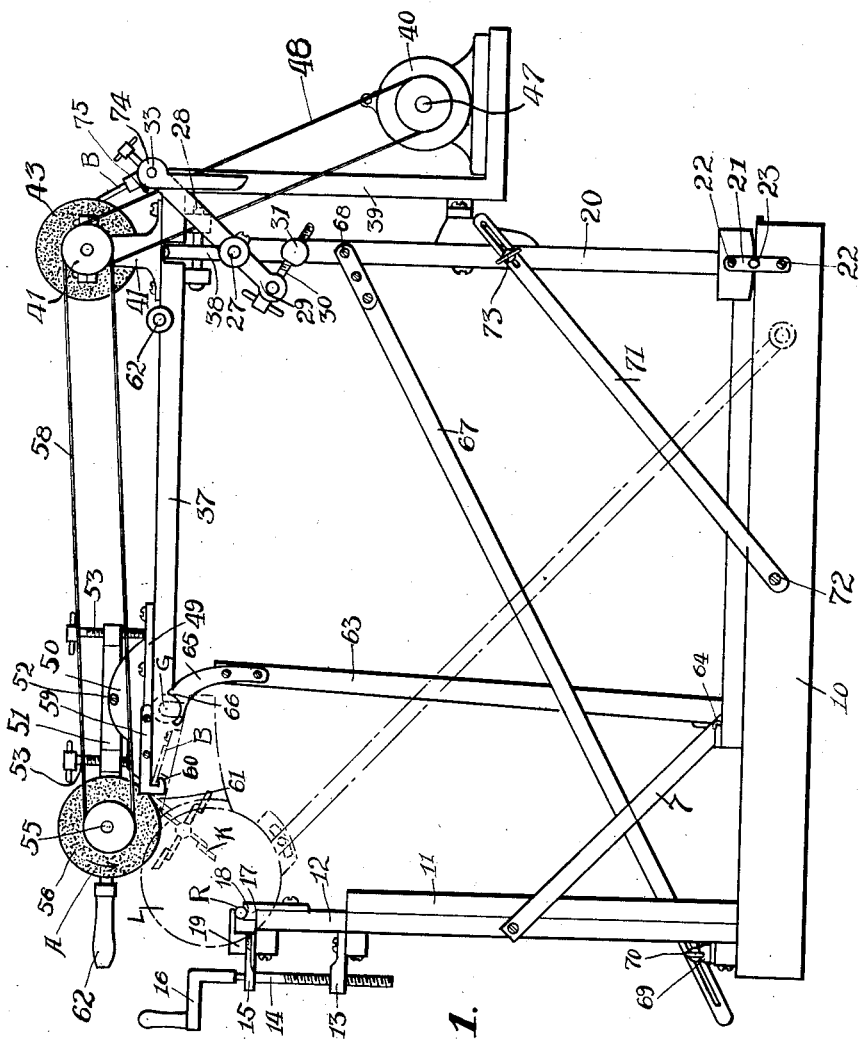
Figure 1 is a side elevation of the improved grinding device showing it in operation in connection with the usual lawn mower.

In carrying out the present invention there is provided a supporting frame 10 having an upright portion 11 provided at one end thereof and adapted to slidably receive or support a sliding frame 12. A bracket 13 is rigidly secured to the upper portion of the upright 11 and has a threaded opening formed therein for the reception of a threaded stem 14, the said stem being swiveled adjacent its upper end to an arm 15 that extends from the sliding frame 12, and an operating crank 16 is rigidly secured to the upper end of said stem. By this arrangement the sliding frame 12 may be delicately adjusted with respect to the upright 11. In order to rigidly secure the lawn mower to the sliding frame 12, supports 17 are secured to each side of the frame 12 and are provided with concave seats 18 for the reception of the usual brace rod R of the lawn mower L. This rod is securely held to the seat 18 by a screw-controlled clamp 19.

A rocking or oscillating frame 20 is secured to the supporting frame 10 by means of straps or links 21 which have their opposed ends secured to the frames 10 and 20 by suitable securing devices 22. These straps have apertures 23 formed intermediate their ends for the reception of a transversely disposed shaft 24 which supports an elongated pulley 25, and one end of the shaft 24 supports the usual drive pulleys 26. A rock shaft 27 is journaled to the upper end of the rock frame 20 and supporting arms 28 are rigidly secured to the opposed ends of the shaft. One of the arms 28 has a depending finger 29 to which a threaded stem 30 is swivelly secured, and this threaded stem engages a threaded aperture formed in a boss 31 extending from the frame 20. The opposed ends of the supporting arms 28 have bearing members 32 formed thereon, in which a transverse supporting rod 33 is rigidly secured. Opposed sleeves 34 are adjustably secured to the rod 33 by means of set screws or other securing devices 35, and the sleeves 34 have recesses 36 formed therein for the reception of the opposed ends of the usual lawn mower bar knife B.

A traveling carriage is provided for transverse movement and includes a base member 37 to which supporting sheaves 38 are journaled, and these sheaves are, in turn, supported by the rock shaft 27. A depending leg 39 is carried by the base member 37 and supports an electric motor or other driving means 40. Opposed bearing members 41 are secured to the upper face of the base member 37, adjacent the sheaves 38, for the reception of a stub shaft 42 having a grinding wheel 43 secured thereto intermediate the bearings 41. A pulley 44 is also secured to the shaft 42 to one side of the grinding wheel 43 and a driving sheave 45 is secured to the shaft 42 at the opposed side of the grinding wheel 43, and a driven sheave 46 is secured to the shaft 42 adjacent the end thereof. The motor 40 carries a drive sheave 47 which is operatively connected with the sheave 46 through the instrumentality of an endless belt or cable 48. That end of the base member 37 which is remote from the bearings 41 has a plate 49 secured thereto, and an ear 50 extends from the plate 49 to which ear a bearing arm 51 is pivotally secured, as shown at 52. Threaded apertures are formed in the bearing arm 51 at opposed sides of the pivot 52 for the reception of adjusting screws 53, and a bearing sleeve 54 is secured at the outer terminal of the arm 51 for the reception of a stub shaft 55. The shaft 55 has a grinding wheel 56 and drive sheave 57 secured thereto, and the sheave 57 is operatively connected with the sheave 45 by means of an endless belt or cable 58. A strap 59 is secured to the base member 37 adjacent the grinding wheel 56 and has a lip 60 depending therefrom, this lip is adapted to operatively engage the bar or ground knife B of the lawn mower during the grinding operation, as will be hereinafter disclosed. It will be observed that a crotch or V-shaped space 61 is defined between the outer edge of the depending lip 60 and the lower portion of the grinding wheel 56, the purpose of which will be apparent from the later disclosures. Operating handles 62 are secured to and extend from the front and side portions of the base member 37 within convenient reach of the operator.

In order to assist in supporting a lawn mower in operative relation with the grinding mechanism of this device, there is provided a supporting leg or member 63 which is hinged at its lower end, as indicated at 64, to the supporting frame 10. A bearing member 65 is secured to the upper terminal of the leg 63 and has a concave seat 66 formed in its upper terminal for the reception of the usual ground roller G of the lawn mower.

The rock frame 20 is adjustably secured to the supporting frame 10 by means of converging brace bars 67 that are pivotally secured to the upper portion of the frame 20 at the opposed sides thereof, as shown at 68, and these braces 67 are united at their lower terminals where they are adjustably secured to a lug 69, upstanding from the frame 20, as indicated at 70. This permits the rock frame 20 to be adjusted relative to the supporting frame 10 and sliding frame 12 in order to position the grinding wheel 56 in operative relation to the lawn mower. An auxiliary adjusting brace 71 is provided and this brace is pivotally secured at its lower terminal to the frame 10, as shown at 72, and its upper terminal is adjustably secured to the rock frame 20 by a thumb screw or the like 73.

In operation the usual brace rod R of the lawn mower L is placed into the concave seats 18 of the supports 17 carried by the sliding frame 12, and the usual ground roller G is placed into the concave seat 66 formed in the bearing member 65 carried by the hinged supporting leg 63. Then the clamp 19 is screwed or clamped on the rod R, thereby rigidly securing the lawn mower L to the sliding frame 12. Now the rocking frame 20 is adjusted to permit the depending or underhanging lip 60 to engage under the usual bar knife B, as shown in Fig. 1. In this position one of the reel knives or blades K is positioned in the crotch 61, and the cutting edge of the reel blade K may be positioned in proper relation to the periphery of the grinding wheel 56 by vertically adjusting the sliding frame 12 by means of the operating crank 16. The angular relation between the cutting edge of the reel blade K and the periphery of the grinding wheel 56 may be further adjusted by means of the screws 53 which moves this wheel about the pivot 52.

After the motor 40 has been put in operation to drive the wheel in the direction indicated by the arrow A, in Fig. 1, the wheel 56 will engage the cutting edge of the reel blade K and accurately grind or sharpen this edge, as the operator moves the traveling carriage along the shaft 27 by slowly pushing and pulling on the handles 62, which move the entire carriage transversely of the machine. This grinding operation may be continued until the edge of the blade K is properly sharpened, by adjusting the wheel 56 by means of the screws 53, and each blade may be sharpened by simply moving it into engagement with the wheel 56. By providing the V-shaped space or crotch 61 between the front edge of the lip 60 and the periphery of the wheel 56, the helically disposed reel knives or blades K may be accurately sharpened, since these knives are trapped between the periphery of the wheel 56 and the front edge of the lip 60, thereby gradually turning the reel as the wheel 56 is moved along the blade K.

The bar knife B may be sharpened by removing it from the mower L, and placing its opposite ends into the recesses 36 formed in the sleeves 34, after which the sleeves are rigidly secured to the supporting rod 33 by means of the set screws 35. The cutting edge of the bar knife B may be properly adjusted with respect to the periphery of the grinding wheel 43 by rotating the threaded stem 30, which moves the bar knife B to or from the wheel 43 according to the direction of rotation of the stem 30. After the motor has been started the carriage is moved along the shaft 27, which causes the wheel 43 to move along the bar knife B and accurately sharpen its cutting edge.

Means are provided for sharpening or gumming the usual hand saw and includes supporting fingers or members 74, which are adjustably secured to the opposed terminals of the supporting rod 33 by set screws or other securing devices 75. An intermediate supporting member or finger 76 is adjustably secured to the rod 33 by means of a set screw or securing device 77. As shown in Fig. 7, the saw S is supported by the fingers 74 and 76 in position to be engaged by a grinding wheel 78 that is carried by the shaft 42. The wheel 78 has a beveled periphery, and is adapted to engage the teeth of the saw as the carriage is moved from tooth to tooth along the edge of the saw S thereby grinding each tooth of the saw.

When it is found advantageous to employ some exterior source of power, then the motor 40 is eliminated, and the elongated pulley 25 is driven by connecting the drive pulleys 26 with any suitable source of power, (not shown). A belt 79, shown in Fig. 8 connects the pulley 44 with the pulley 25, and as the traveling carriage is moved transversely of the machine the belt 79 moves along the elongated pulley 25 and continues to impart motion to the shaft 42 through the belt 79.

Having thus described the invention, what is claimed is:—

1. A lawn mower grinder including a supporting frame, means for adjustably securing a lawn mower relative to the supporting frame, a rocking frame, a carriage supported for movement upon the rocking frame, grinding means supported by the carriage, and means supported by the carriage for securing the grinding means in operable relation to the reel blades of the lawn mower.

2. A lawn mower grinder including a supporting frame, a slidable frame adjustably secured to the supporting frame and adapted to support a portion of a lawn mower, a hinged supporting member supported by the supporting frame and adapted to coöperate with the slidable frame to adjustably support the lawn mower in position for grinding, a rocking frame supported by the supporting frame, a traveling carriage supported by the rocking frame, and means carried by the traveling carriage for grinding the cutting edges of the lawn mower.

3. A lawn mower grinder including a supporting frame, a sliding frame adjustably supported by the supporting frame, a hinged leg supported by the supporting frame, said hinged leg and sliding frame coöperating to adjustably support a lawn mower, and grinding means supported in operable relation to the lawn mower.

4. A lawn mower grinder including a supporting frame, a sliding frame adjustably supported by the supporting frame, means for adjustably securing the lawn mower upon the sliding frame, a rocking frame, a carriage mounted for movement upon the rocking frame, grinding means carried by the carriage, and means supported by the carriage for securing the grinding means in operable relation to the reel blades of the lawn mower.

5. A grinding device including a supporting frame having an upright portion, a sliding frame supported by the upright portion, means for adjusting the sliding frame with respect to the upright portion of the supporting frame, supports carried by the sliding frame and having concave seats formed therein for the reception of the usual brace rod of a lawn mower, means for clamping the brace rod to the supports, a supporting leg hingedly secured to the supporting frame, a bearing member carried by the supporting leg and having a concave seat formed therein for the reception of the usual ground roller of the lawn mower, a rocking frame pivotally secured to the supporting frame, a traveling carriage supported by the rocking frame, grinding means carried by the said carriage and adapted to operably engage the cutting edges of the usual reel knives of the lawn mower, and means for driving the said grinding means.

6. A grinding device including a supporting frame having an upright portion, a sliding frame adjustably secured to the said upright portion and adapted to support a lawn mower, a rocking frame adjustably supported by the said supporting frame, a transversely disposed shaft secured to the upper terminal of the rocking frame, a traveling carriage, supporting sheaves journaled to the said carriage and adapted to engage the said shaft to support the traveling carriage for longitudinal movement along the said shaft, a grinding wheel adjustably supported by the traveling carriage, means for holding the grinding wheel in operable engagement with the cutting edges of the reel knives of the lawn mower, and means for driving the grinding wheel.

7. A grinding device including a supporting frame having an upright portion, a sliding frame adjustably secured to the upright portion and adapted to support a lawn mower, a rocking frame adjustably supported by the supporting frame, a traveling carriage supported by the rocking frame, a plate secured to the said carriage and having an upstanding ear, a bearing arm pivotally secured to the said ear and having threaded apertures formed therein, a bearing sleeve carried by the said arm, a shaft journaled in the said sleeve, a grinding wheel secured to the said shaft, opposed adjusting screws received by the threaded apertures of the said bearing arm and adapted to adjust the grinding wheel with respect to the cutting edges of the reel knives of the lawn mower, a strap secured to the said plate, a depending lip carried by the said strap and adapted to hold the grinding wheel in operable relation to the reel knives of the lawn mower, and means for driving the grinding wheel.

In testimony that I claim the foregoing as my own, I have hereto affixed my signature in the presence of two witnesses.

ANDREW KLAY.

Witnesses:
DWIGHT MURRAY,
D. S. FLICK.